(12) United States Patent
Minshull et al.

(10) Patent No.: US 11,652,427 B2
(45) Date of Patent: May 16, 2023

(54) CONTROL DISTRIBUTION ARCHITECTURE

(71) Applicant: Hamilton Sundstrand Corporation, Charlotte, NC (US)

(72) Inventors: Stephen Minshull, Bromsgrove (GB); Grzegorz Popek, Birmingham (GB)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/677,063

(22) Filed: Feb. 22, 2022

(65) Prior Publication Data

US 2022/0271689 A1   Aug. 25, 2022

(30) Foreign Application Priority Data

Feb. 22, 2021   (EP) .................................... 21275019

(51) Int. Cl.
  H02P 21/16      (2016.01)
  H02P 5/50       (2016.01)
  B64D 41/00      (2006.01)

(52) U.S. Cl.
  CPC ................ *H02P 5/50* (2013.01); *B64D 41/00* (2013.01)

(58) Field of Classification Search
  CPC .................................... H02P 5/50; H02P 5/00
  See application file for complete search history.

(56) References Cited

U.S. PATENT DOCUMENTS

| | | |
|---|---|---|
| 8,125,164 B2 | 2/2012 | White |
| 8,188,694 B2 | 5/2012 | Tallam et al. |
| 9,209,721 B2 | 12/2015 | Solodovnik et al. |
| 9,515,484 B2 | 12/2016 | Huang et al. |
| 9,991,719 B2 | 6/2018 | Krolak et al. |
| 10,396,554 B2 | 8/2019 | Chik et al. |
| 2010/0013419 A1 | 1/2010 | White |
| 2012/0153882 A1 | 6/2012 | Hong et al. |
| 2019/0089288 A1 | 3/2019 | Koseki et al. |
| 2019/0363600 A1 | 11/2019 | Matsumoto et al. |
| 2020/0395878 A1* | 12/2020 | Takahashi ............ H02K 1/2786 |

FOREIGN PATENT DOCUMENTS

| | | |
|---|---|---|
| EP | 2171837 B1 | 4/2016 |
| WO | 2005031939 A1 | 4/2005 |
| WO | 2020188178 A1 | 9/2020 |

OTHER PUBLICATIONS

European Search Report for Application No. 21275019.4, dated Jul. 29, 2021, 8 pages.

* cited by examiner

*Primary Examiner* — Muhammad S Islam
(74) *Attorney, Agent, or Firm* — Cantor Colburn LLP (57) ABSTRACT

A system for providing electric motor control to a plurality of motor loads. The system comprises a plurality of motor controllers that are configurable into different arrangements of motor controllers. The system further comprises a central controller that is operable to individually set a phase and/or frequency of respective PWM carrier signals for the motor controllers, wherein the central controller is configured to set the phase and/or frequency of the PWM carrier signals for the motor controllers within a respective arrangement of motor controllers differently depending on the configuration of the motor controllers within the arrangement.

14 Claims, 7 Drawing Sheets

CONTROL DISTRIBUTION ARCHITECTURE

CROSS-REFERENCE TO RELATED APPLICATIONS

This application claims priority to European Patent Application No. 21275019.4 filed Feb. 22, 2021, the entire contents of which is incorporated herein by reference.

TECHNICAL FIELD

The present disclosure is concerned with distributing power between, and controlling, multiple electric motor loads.

BACKGROUND

Many types of electrical system include several loads to be provided with power and to be controlled. Traditionally, each load would have its own dedicated power supply and its own dedicated motor controller, since the different loads may have different power and control requirements. In other systems, the motor loads may be supplied from a common power supply, but each still has its own dedicated motor controller.

In some fields, there is a desire or a trend to reduce the number of system components in order to e.g. reduce weight or size or complexity.

In aircraft, there is currently a trend towards so-called More Electric Aircraft (MEA) whereby loads such as flight control surfaces, landing gear, actuators, fans, pumps etc. . . . which have traditionally be controlled by hydraulic and mechanical systems are now being designed to be controlled electrically by means of an electric motor. Steps are also being made towards All Electric Aircraft, where all loads, including the propulsion systems, will be controlled by electric motors.

Whilst there are clear and significant advantages to electrical control of aircraft systems, and electrical control of systems in other fields, in terms of weight, size, reliability, environmental factors, cost and maintenance, it is believed that further improvements can be made.

Thus, the aim of the present disclosure is to provide a control architecture and method that can further improve the size, weight and efficiency of electrical systems having several electrically driven loads.

SUMMARY

According to a first aspect of the disclosure, there is provided a system for providing electric motor control to a plurality of motor loads, the system comprising of a plurality of motor controllers that are configurable into different arrangements of motor controllers, with each respective arrangement of motor controllers arranged to drive one or more of the motor loads, wherein a motor controller may be configured within a respective arrangement of motor controllers either to drive a respective motor load by itself or as part of a group of motor controllers that drive a respective motor load in combination, wherein at least some of the motor controllers in the plurality of motor controllers comprise a respective pulse width modulation (PWM) circuit for controlling an output of the motor controller, the PWM circuit being controlled based on a respective PWM carrier signal; the system further comprising a central controller that is operable to individually set a phase and/or frequency of the respective PWM carrier signals for the different motor controllers, wherein the central controller is configured to set the phase and/or frequency of the PWM carrier signals for the respective motor controllers within an arrangement of motor controllers differently depending on the configuration of the motor controllers within the arrangement.

As will be explained further below, the present disclosure particularly relates to a system for providing electric motor control to a plurality of motor loads, wherein the system includes a plurality of motor controllers that can be flexibly configured, and dynamically re-configured, as desired, into and as different respective 'arrangements' of motor controllers, e.g. in use, e.g. depending on the current motor load requirements.

The system can thus be configured such that, at any instant in time, there is a respective working set of motor controllers that are currently 'active' (which working set may, e.g., comprise all of the available motor controllers, or may comprise only a subset of one or more of the available motor controllers) and that are arranged to drive one or more of the motor loads. The system is then re-configurable such that at another (e.g. later) instant in time, the motor controllers can be configured into a different arrangement, e.g. to drive a different one or more of the motor loads.

The motor controllers within a respective arrangement of motor controllers may themselves be configured differently depending on the current motor load requirements.

For example, in some cases, a given motor controller may be configured to drive a single, respective load individually. However, in some cases, a single motor controller operating individually may not be able to provide the desired motor load by itself. In that case, two or more motor controllers may be configured to operate in combination to drive a single, respective load.

When two or more motor controllers are operating in combination to drive a single, respective load, the operation of the motor controllers should desirably be synchronised. For instance, in the present disclosure, at least some (and typically all of) the motor controllers within the system comprise a respective pulse width modulation (PWM) (inverter) circuit for controlling an output of the motor controller. The PWM circuit is controlled based on a respective PWM carrier signal, e.g. in the normal manner for pulse width modulation techniques.

When two or more motor controllers are operating in combination, the PWM carrier signals should therefore be substantially aligned, e.g. having substantially the same frequency and phase relationship.

In the present disclosure the PWM carrier signals can be (and are) generated under the control of a central controller that is operable to independently set the PWM carrier signal for each of the individual motor controllers within the system. For example, the central controller may transmit a synchronisation pulse to each (active) motor controller in order to trigger the generation of the PWM carrier signal at the motor controller.

In embodiments the central controller also transmits a suitable data message (instruction) for setting one or more characteristics of the PWM carrier signal appropriately. Thus, the central controller may address each of the motor controllers and transmit a suitable data message (instruction) to set the respective PWM carrier signal for each motor controller, as desired.

For example, in this way, the central controller may be operable to set a desired phase delay (relative to the synchronisation pulse) for the PWM carrier signal.

The central controller may also be able to set a desired frequency for the PWM carrier signal.

The motor controller can then receive the synchronisation pulse and any other data messages from the central controller and then generate the PWM carrier signal accordingly, e.g. at the appropriate time, and with the instructed phase and/or frequency.

Thus, in embodiment, when two or more motor controllers within a partition are operating in combination (in parallel) to drive a respective motor load, the central controller is configured to substantially align the PWM carrier signals for the motor controllers that are operating in combination. In that case, the central controller may set the phase and frequency of the PWM carrier signals to the same values for all of the motor controllers that are operating in combination.

In this way it can be ensured that the motor controllers that are operated in combination are operating in phase, e.g. to limit any current circulating between the motor controllers.

On the other hand, when two or more motor controllers are being operated independently, such that each motor controller itself drives a single, respective motor load, the present disclosure recognises that it is not necessary to align PWM carrier signals, and that it may be better to use phase-shifted PWM carrier signals, e.g. to reduce common mode electromagnetic interference (EMI) emissions, as will be explained further below.

Thus, in embodiments, where two or more motor controllers are being operated independently, the central controller is configured to set the phase of the PWM carrier signals for the two or more independent motor controllers differently. In particular, the central controller may set the PWM carrier signals appropriately to reduce EMI emissions.

For example, where there are two motor controllers that are operating to drive respective loads individually, the central controller may, and in an embodiment does, set the PWM carrier signals for the two motor controllers to be 180 degrees out of phase with each other.

In particular, the central controller may be caused to set the PWM carrier signals for an arrangement of motor controllers to have alternating 180 degrees phase shifts. In this way it is possible to cancel some of the common mode current and hence reduce EMI emissions.

For cases where the current arrangement of motor controllers includes a group of two or more motor controllers that are operating in combination to drive a first motor load and further includes another motor controller that is being operated to drive a second, independent motor load, in that case the PWM carrier signals for all of the motor controllers in the group of motor controllers that are operating in combination to drive the first motor load may be aligned (in phase), whereas the PWM carrier signal for the motor controller driving the second motor load may be out of phase.

Various other phase relationships between the motor controllers would be possible, depending on the number and arrangement of motor controllers.

For example, in another embodiment, rather than setting the PWM carrier signals for two or more of the motor controllers to be 180 degrees out of phase with other, the central controller may be caused to set the phase relationship for the PWM carrier signals for a plurality of motor controllers such that each carrier signal is shifted by a small amount such that the PWM carrier signals are slightly out of phase such that switching events (e.g. on/off transitions for the power switch device that is performing the PWM) do not align. For example, the PWM carrier signals may be shifted by a time delay between about 5 to 500 nanoseconds. This will then slightly de-synchronise the PWM carrier signals and again can allow common mode emissions to be reduced.

Thus, in embodiments, the PWM carrier signals for at least two of the two or more independent motor controllers are phase shifted such that switching events for the PWM within the motor controllers are misaligned.

In other embodiments, alternatively, or in addition to, varying the phase relationship between independent motor controllers, where there are two motor controllers that are operating to drive respective loads individually, the central controller may, and in an embodiment does, set the PWM carrier signals for the two motor controllers to have different frequencies. Thus, in embodiments, where two or more motor controllers are being operated independently, the central controller is configured to set the frequency of the PWM carrier signals for the two or more independent motor controllers differently. Various arrangements would be possible in that regard.

Thus, in the present disclosure, depending on the configuration of the motor controllers within a partition, and in particular depending on whether they are being operated individually or in combination, the central controller can then set the PWM carrier signals appropriately, e.g. to try to reduce EMI emissions where possible, whilst still meeting the desired motor load requirements. This in turn may allow for a reduction in overall size and weight of passive EMI filters, which may be particularly suitable for avionics applications.

As mentioned above, the system is configurable to drive different motor loads. Thus, in embodiments, the system comprises switching means configured to selectively provide electrical connections between the one or more motor controllers and the loads; and a controller arranged to configure the switching means to connect one or more of the motor controllers to one or more of the loads in response to a control signal.

The controller may be arranged to configure the switching means to connect one or more of the motor controllers to one or more of the loads in a time multiplexed manner in response to the control signal indicating changes in the motor load(s) to be controlled over time.

In some embodiments the number of motor controllers is less than the number of motor loads to be controlled. However, this need not be the case and there may in general be any suitable number of motor controllers, as desired.

The system may also include a common high voltage power supply for the one or more motor controllers.

The system may also include a power converter to convert the high voltage power to a low voltage power supply for components of the system.

A power bus may provide low voltage power external to the system.

To make assembly and reconfiguration/replacement easier, the system may include a housing rack into which the one or more controllers, the switching means and the controller can be removably and replaceably mounted.

If required to drive large loads, the controller can be configured to cause the switching means to connect two or more motor controllers to a single load.

The controller may be configured to cause the switching means to change the connection to another motor controller in the event of a detected failure in a motor controller currently connected to a load.

According to another aspect, there is provided a method of driving a plurality of electric motor loads using a system substantially as described above, the method comprising configuring an arrangement of motor controllers to drive one or more of the motor loads, and setting the PWM carrier signals for the motor controllers appropriately based on the configuration of the motor controllers within the arrangement of motor controllers.

The system may then be reconfigured into a different arrangement of motor controllers to drive (a different) one or more of the motor loads, and the PWM carrier signals then set appropriately for the new arrangement. Thus, over time, the arrangement of motor controllers can be re-configured, e.g. to drive different ones of the one or more motor loads, and the PWM carrier signals appropriately for each new arrangement.

In the embodiment described in detail, the loads are aircraft loads and the control signal causes the switch configurations to change according to the flight path of the aircraft. Thus, in embodiments, the motor loads may comprise motor loads for driving aircraft components such as aircraft actuation systems (including actuators for flight control surfaces, landing gear, and so on), compressors, fans, pumps, etc. The system may, however, also be used with different loads.

Embodiments will now be described, by way of example only, with reference to the drawings.

DETAILED DESCRIPTION

First, by way of background, a more conventional electric motor drive architecture will be described with reference to FIG. 1.

Figure 1:
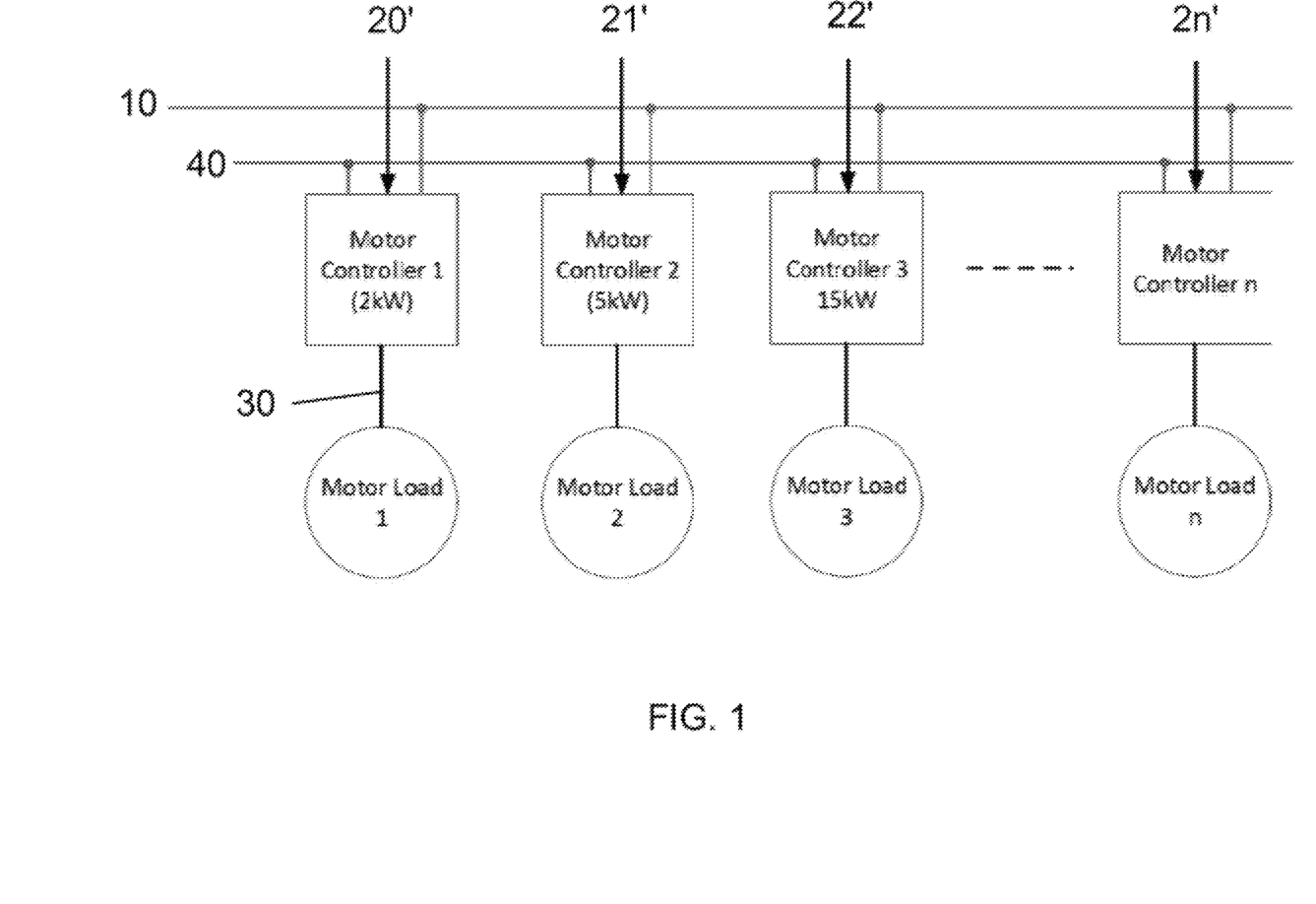
FIG. 1 is a block diagram of a more conventional electric motor drive architecture with multiple loads.

The system shown in FIG. 1 comprises a plurality of motor loads 1 . . . n each driven by an electric motor (not separately shown). Each motor load 1 . . . n is provided with power and control by a respective motor controller 1' . . . n'. Each motor and motor controller is a dedicated motor/motor controller designed for the specific load with e.g. the appropriate peak and average power rating for that load.

Power is provided to each of the motor controllers. In the example shown, the motor controllers receive high voltage power 10, which could be AC or DC, from the aircraft electrical network. This is converted in the motor controller to a suitable form to power the respective motors. Typically, each motor controller outputs, 30, a 3-phase AC output voltage to control a 3-phase AC current in its electric motor. Each motor controller is also typically connected to a low voltage DC power supply 40 which provides power to the motor controller for control and monitoring functions. Each motor controller 1' . . . n' receives command signals and can provide feedback data over a data bus 20', 21' . . . 2n' to a higher level system controller e.g., in the case of aircraft systems, a flight control computer (FCC) for a primary flight actuator load.

In systems having several motors and several motor loads, it may be that not all motors need to be operated at all times. In an aircraft system, for example, some motors or motor loads may only need to be operated for short periods or infrequently depending on the different stages of the flight. As an example, the landing gear actuators are only required just after take-off and just before landing. There are many other situations, both in aircraft and other systems having multiple motors/motor loads where not all are used at the same time and all of the time.

Figure 2:
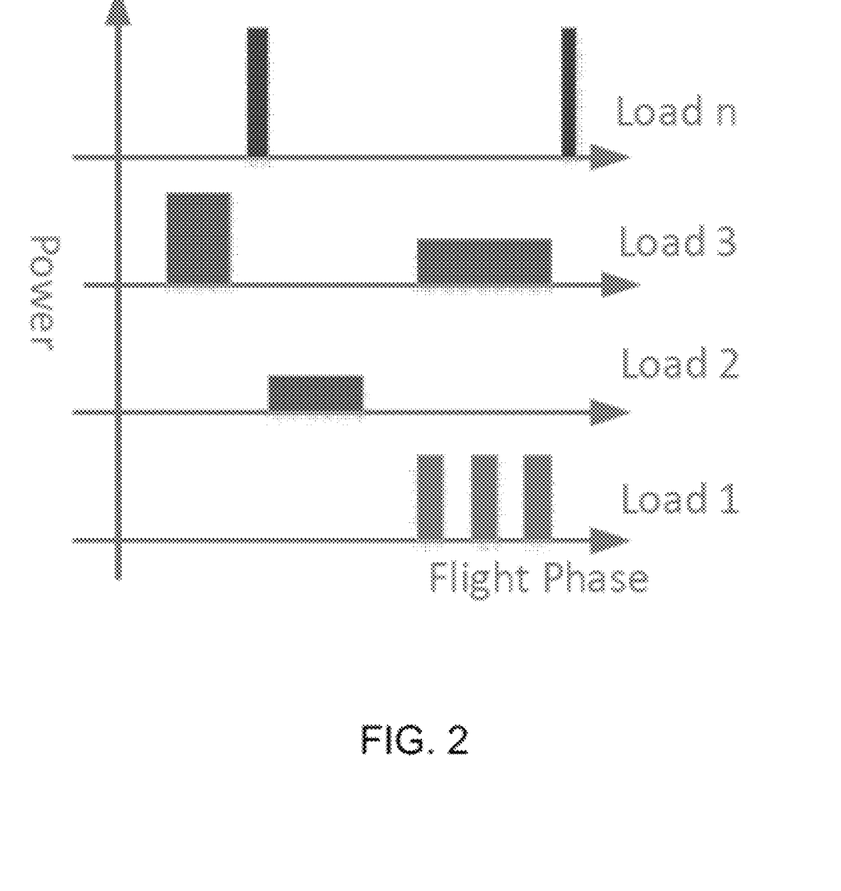
FIG. 2 shows an example of activation of different motor loads at different flight phases of an aircraft when the motor loads are in an aircraft control system.

FIG. 2 shows a timing diagram as an example of how four loads, and, therefore, four electric motors, might be utilised during a flight. As can be seen, load 1 is only required to be driven for some short intervals towards the end of the flight. Load 2, on the other hand, is only driven after take-off, for a period of time. Load 3 is driven during just after take-off and before landing. Load n is only driven for a short time after take-off and landing. This is clearly just one example, but shows that inefficiencies can exist when multiple loads with respective multiple electric motors and, hence, respective multiple motor controllers are installed. The size and weight, as well as cost and maintenance is not necessarily in proportion to the amount of time all of the motors need to be operated.

The present embodiment relates to a flexible architecture where, rather than each motor controller driving a respective associated (fixed) motor load, the system is configurable to allow motor controllers drive different motor loads, and for the allocation of motor controllers to motor loads to be re-configured in use.

Figure 3:
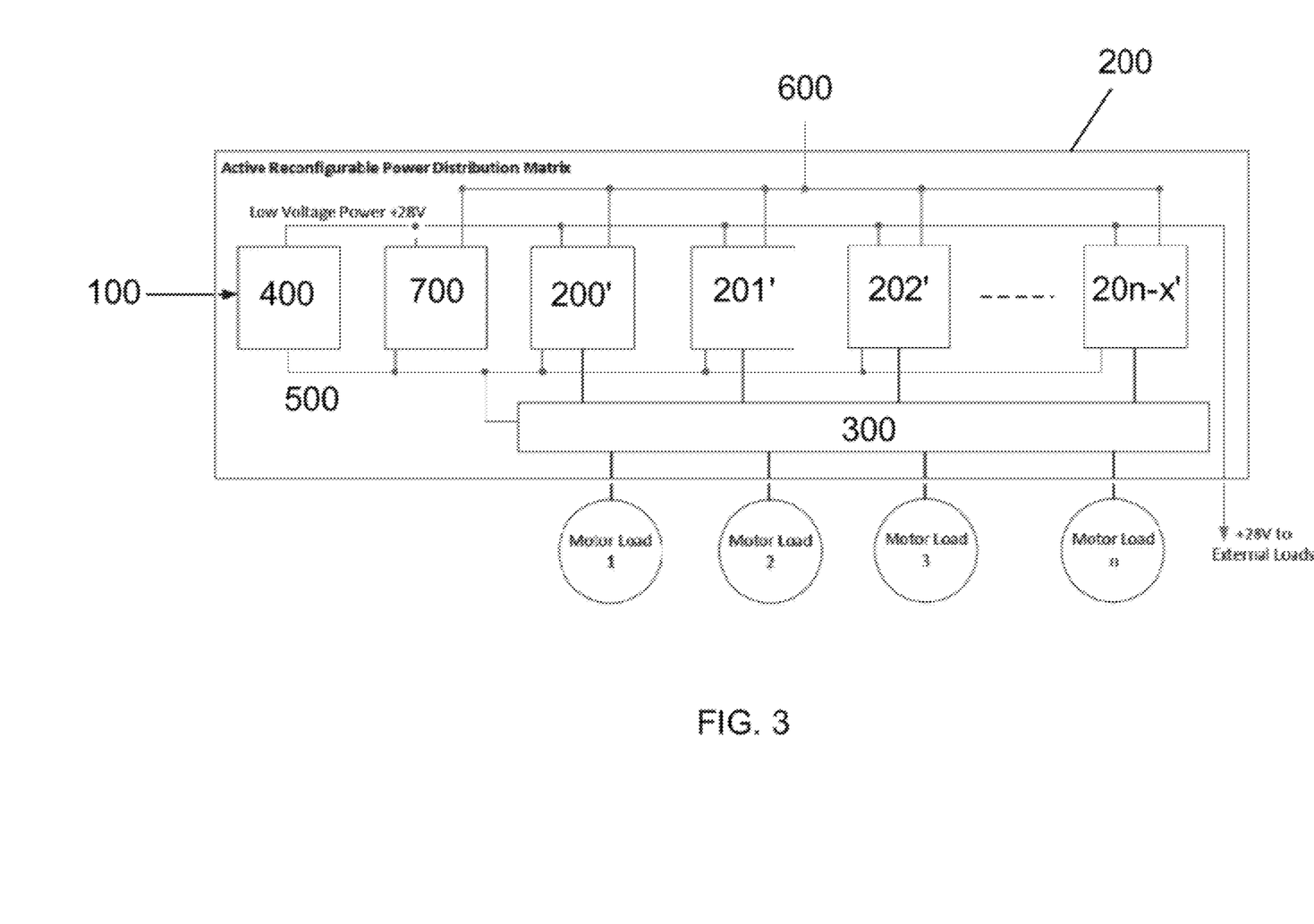
FIG. 3 is a block diagram of an electric motor drive architecture according to the disclosure.

The architecture will now be further described with reference to FIG. 3. In particular, in the system shown in FIG. 3, a smaller number of motor controllers can be provided and their use can be substantially optimised for driving several loads as they are required. The architecture can therefore reduce the number of motor controllers to less than the number of motor loads by multiplexing the motor loads through suitable switching means, in this example in the form of an interconnection matrix. The interconnection matrix is configured such that each motor load is connected to a motor controller as and when the motor load needs to be operated. In this way, depending on the system and its application, it might be possible to have (e.g.) half as many motor controllers as motor loads, which would greatly reduce the overall weight and size and improve efficiency of the system.

As with the conventional arrangement shown in FIG. 1, the system is provided to operate a number of motor loads 1, . . . , n based on control data (here aircraft data 100). The architecture is shown, for simplicity, in a distribution matrix 200 which contains one or more motor controllers 200'-20n-x'. The actual number of motor controllers will depend on the system and its application but will be fewer than the number of motor loads, n. In one example, there are n/2 motor controllers. The motor controllers are in communication with the motor loads via a switching matrix 300, the configuration of which is controlled by a centralised controller 400.

The control data for controlling the motor loads is input as a control signal to the centralised controller 400 which, based on the control data and the requirements for the loads at any time, will configure the switching matrix, via a data bus 500, to connect one or more available motor controllers to the load(s) to be operated at that time according to the control signal and requirements of the loads identified in the control signal. The motor controllers communicate with the centralised controller to receive commands and information about the load e.g. load type.

The centralised controller can also receive commands and provide feedback for the loads and for wider systems via the data bus. The communication between the centralised controller and the motor controllers can use any suitable communication protocol e.g. CAN, Mandex-based protocols, etc.

In the arrangement shown, the motor controllers receive power from a common high voltage source 600 which could be AC or DC, although power could be provided to the motor controllers in different ways.

The structure and power output of the motor controllers may all be the same or different, and a suitable motor controller can be selected by the centralised controlled according to load requirements. To simplify the system, standard design motor controllers can be utilised all with the same power rating. This allows the motor controllers to be easily exchanged or further motor controllers to be added as required.

For instance, if required, the switching matrix can be configured to combine several motor controllers in parallel to drive a larger load.

The system also includes a power converter 700, here shown as a 28 V power converter, as an example. This can convert the high voltage power to a low voltage power which can be distributed to the parts of the system to provide power to the motor controller and the centralised controller for control and monitoring but which can also be provided to other systems or equipment external to the distribution matrix. This can reduce the amount of cabling/wiring needed in and around the distribution system which is especially advantageous where space and weight is at a premium e.g. in aircraft.

The components of the system can, for convenience, be mounted in a rack system so that different architectures can be readily configured e.g. by removing or slotting in motor controllers.

In the event of a failure within a motor controller or part of the switch matrix, the centralised controller can reconfigure the system to connect a motor load to be driven by a different, functioning motor controller or, if all available motor controllers are in use at the time of failure, the centralised controller can prioritise the most important loads and ensure these are serviced by reconfiguring the switch matrix.

The switch matrix 300 can be configured e.g. as a full matrix whereby every load can be connected to any and every motor controller, or could be configured as a sparse matrix having a reduced number of connection configurations and switches. Switches can be switches known in the art e.g. contactors or solid state AC switches.

By sharing a smaller number of motor controllers between the loads and controlling a switching matrix to connect the available motor controllers to the loads to be driven as required, fewer motor controllers are required than in conventional systems which results in a lower overall system weight and size and reduced cost and maintenance. Development costs can be reduced as common hardware can be applied across the system for all load types and if a rack housing is used, different system configurations can be easily and quickly realised. The system is also quickly adaptable and responsive to failure to ensure that the system can continue to operate even if a motor controller fails. Further, because the control of multiple systems in centralised and coordinated there is an improved ability to monitor data and anticipate failure and then to respond quickly to address such failure.

In this architecture, a centralised controller receives commands from the aircraft and decides how to configure the switch matrix in order service the aircraft commands. It also passes on the relevant command (e.g. position, speed or torque) to each motor controller channel. The switch matrix then provides the physical electrical connection between the motor controller outputs and the motor loads. A data bus between the centralised controller, motor controller channels and switching matrix facilitates the communication.

Figure 4:
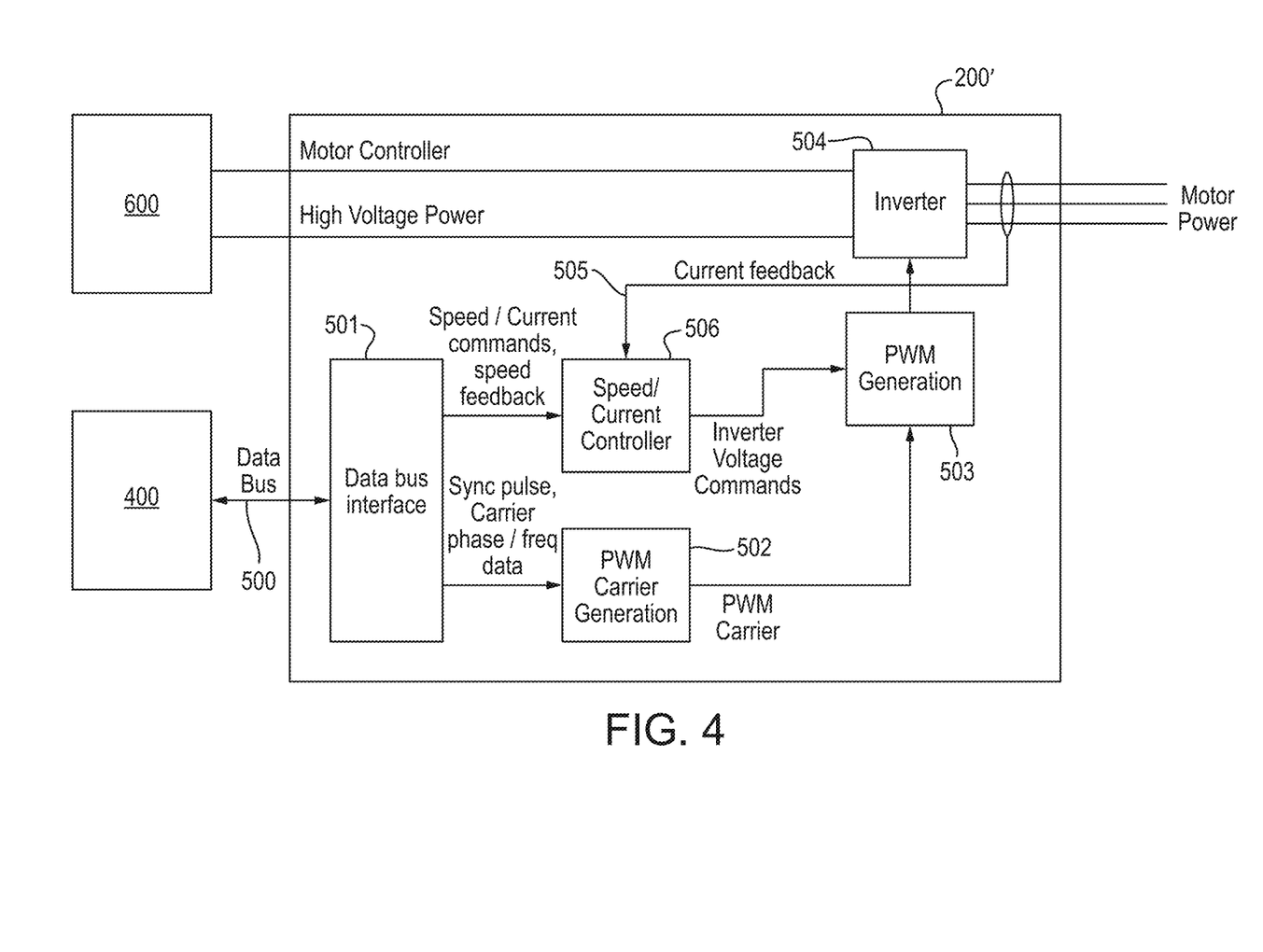
FIG. 4 shows in more detail a motor controller that may be used within the electric motor drive architecture according to the disclosure.

FIG. 4 shows in more detail the architecture of a single motor controller 200'. As shown in FIG. 4, the motor controller utilises a Pulse Width Modulated (PWM) inverter 504 to synthesise the drive voltages required by the motor loads. Typically, these are 3-phase, sinusoidal waveforms. The PWM inverter 504 thus receives power from the common high voltage source 600 and modulates this accordingly to provide the desired motor load, e.g. in the normal fashion for pulse width modulation.

The motor controller includes PWM Generation unit 503 that generates the pulse width modulation. The pulse width modulation is performed using a PWM carrier signal. For instance, the Speed/Current Controller 506 provides the PWM Generation unit 503 with the target voltage for the PWM inverter 504, and a PWM Carrier Generation unit 502 provides the PWM Generation unit 503 with a suitable PWM carrier signal. The PWM Generation unit 503 then controls the PWM inverter 504 to provide the target voltage using the PWM carrier signal (in a manner that is generally known in the art).

This operation is performed under the overall control of the central controller 400. The central controller 400 thus provides via a suitable data bus 500 data messages for controlling the motor controller to perform the desired pulse width modulation. The motor controller thus includes a suitable data bus interface 501 for handling these communications.

For instance, as mentioned above, the central controller 400 provides the speed feedback, and speed/current commands to the Speed/Current Controller 506, which information is then used, along with the current feedback 505 from the PWM inverter 504, to set the target voltage.

The central controller 400 is further operable to control the PWM Carrier Generation 502. In particular, when a motor controller is required to deliver a motor load, the motor controller can be suitably connected to the motor load, via the interconnection matrix, as described above, and the central controller 400 can then issue a synchronisation pulse to trigger the PWM Carrier Generation 502.

In the present embodiment the central controller 400 also transmits data messages to the PWM Carrier Generation 502 to set the, e.g., phase delay, and/or frequency, of the PWM carrier signal for the motor controller, as will be explained further below.

In this way, the central controller 400 is operable to set the PWM carrier signals for each of the motor controllers appropriately. This operation will be described further below.

For example, when motor controller inverters are operated in parallel to drive a single motor load, the PWM carrier signals for each of the paralleled inverters should be in phase to limit any circulating current between inverter channels, and the central controller 400 can thus set the PWM carrier signals accordingly.

On the other hand, when the motor controllers are operating separately to drive independent loads, the PWM carrier signals can be configured to be 180° out of phase with one another. This may help reduce Common Mode (CM) Electromagnetic Interference (EMI) emissions by cancelling CM currents circulating between the motor controllers.

For instance, due to the switching nature of the inverter circuits, as well as parasitic capacitances within the switching circuits, cables and motor loads, etc., the system will produce some CM EMI emissions. These should desirably be reduced. For example, there are stringent limitations imposed by aircraft system integrators (e.g. DO160) that limit these emissions to prevent interference with other aircraft systems.

In this regard, the present disclosure recognises that in systems where multiple motor controller inverters are operated at the same time from a common power source (e.g. as in the system depicted in FIG. 3), the phase relationship of the PWM carrier signals between the inverters will impact the EMI emissions of the system.

This present disclosure thus provides a method for reducing EMI emissions by automatic configuration of the PWM carriers depending upon the configuration of the motor controllers within the system, e.g. as will now be explained.

The function of the centralised controller with the architecture described above is to receive the aircraft commands for motor operation and to determine how best to configure the plurality of motor controllers to service the command. Thus, when a high power motor load must be driven, the system may configure at least some motor controllers to operate in parallel, with the switching matrix creating the parallel connection of motor controller outputs.

Figure 5:
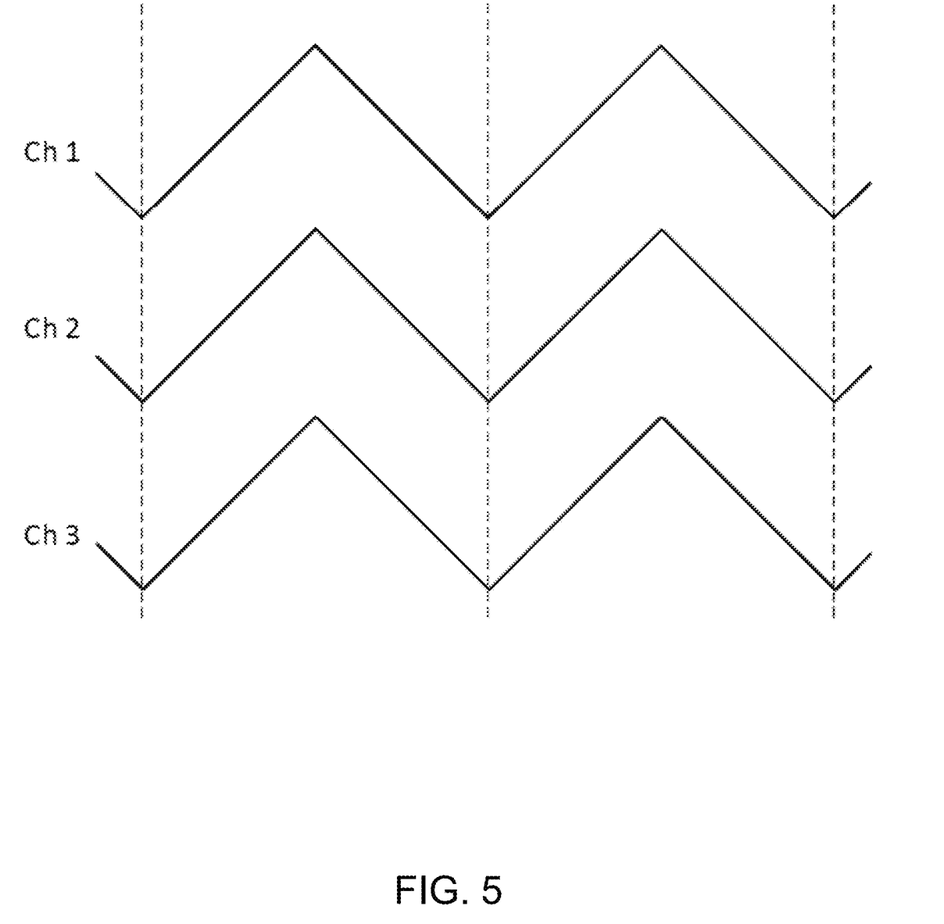
FIG. 5 shows an example according to the disclosure of how the phase relationship for the PWM carrier signals may be set when a plurality of motor controllers are operating in parallel to generate a combined load.

In that case, the centralised controller 400 may synchronise the PWM carriers to be in phase, e.g. as shown in FIG. 5. This ensures minimum volt-second differences in inverter output voltages to reduce circulating currents.

Figure 6:
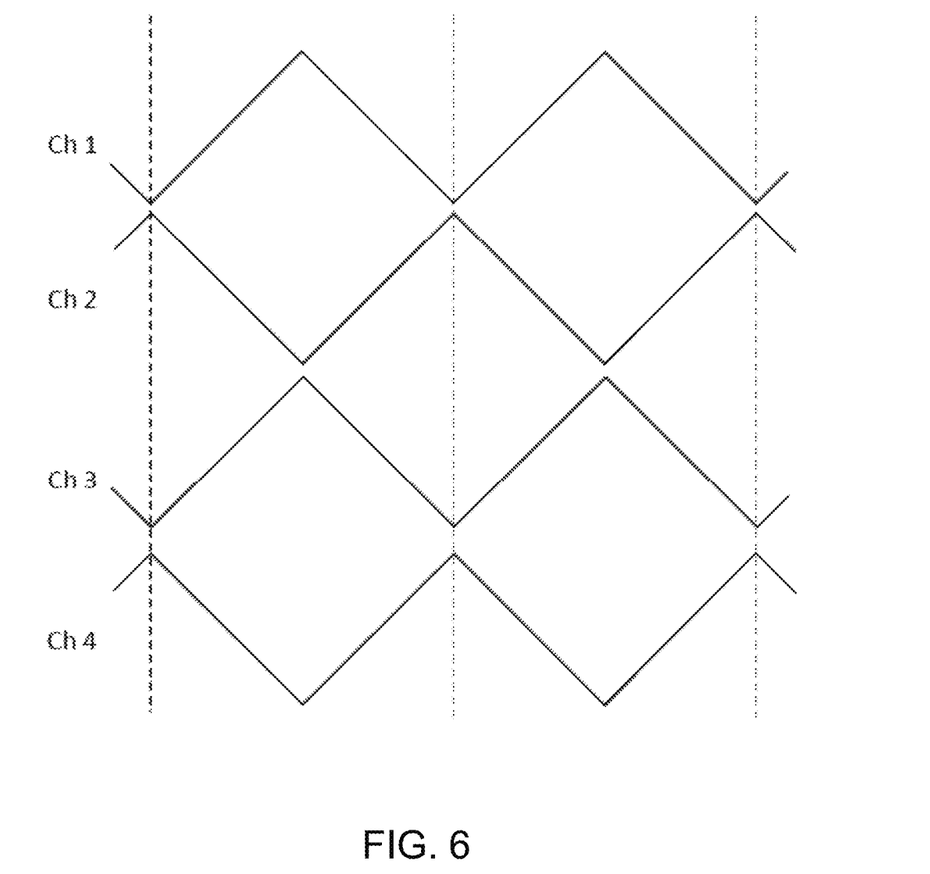
FIG. 6 shows an example according to the disclosure of how the phase relationship for the PWM carrier signals may be set when a plurality of motor controllers are operating individually to generate multiple independent loads.

In some cases, the aircraft command requires multiple independent motor loads to be driven at the same time. The central controller 400 may thus configure the motor controllers to each individually drive a respective independent loads. In that case, the centralised controller 400 can set the carrier signals to have alternating 180° phase shifts as shown in FIG. 6 (Ch1=0°, Ch2=180°, Ch3=0°, Ch4=180°, etc.). This will reduce the CM emissions by cancelling some of the CM current flowing into the chassis return.

Figure 7:
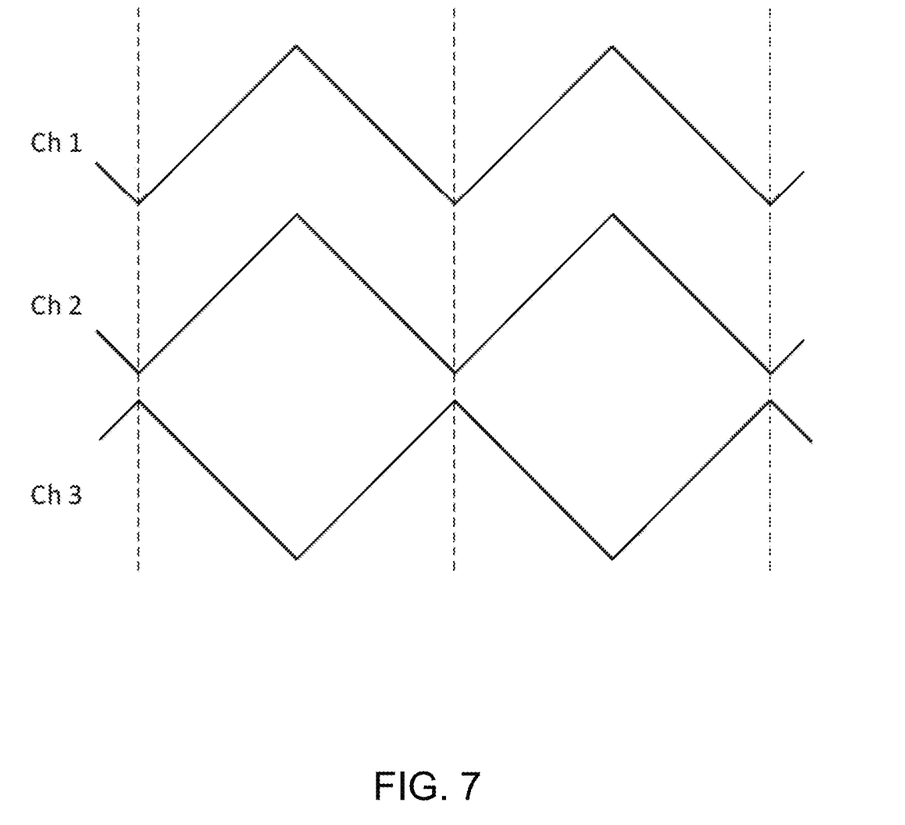
FIG. 7 shows another example according to the disclosure of how the phase relationship for the PWM carrier signals may be set when a plurality of motor controllers are operating in parallel to generate a combined load.

For the condition where the aircraft command requires a parallel connection for some motor controller channels and also to drive independent loads (FIG. 7), the centralised controller 400 can configure the phase relationship with 0° phase shift between the parallel channels (Ch1 and Ch2) and a 180° phase shift for the third independent channel (Ch3). This reduces circulating current for the parallel channels and helps reduce CM emissions with the independent channels.

The synchronisation of the motor channels can be achieved through Phase Locked Loop (PLL) structures operating in hardware or software on the motor controllers. The PLLs receive a common synchronising pulse via the data bus that is provided by the centralised controller and is received by each motor controller. Additional data words provided over the data bus instruct the motor controller channel to either synchronise or include a 180° delay within the PWM carrier.

An alternative approach for independent loads is for the centralised controller 400 to command slightly different switching frequencies (e.g. 20 kHz, 21 kHz, 22 kHz, etc.) for channels operating into independent motor loads. Again, this may help reduce EMI emissions. This switching frequency command can also be provided over the data bus by the centralised controller 400. Thus, for independent operation, the PWM carriers can be configured to have slightly different frequencies to help spread the EMI noise spectrum and reduce EMI emissions peaks.

Of course other arrangements for de-synchronising PWM carriers would also be possible. For example, rather than introducing alternating 180 degree phase shifts, in the manner described above, it would also be possible to introduce smaller phase shifts (e.g. for at least the duration of the on/off transition of the power switch in the PWM Generation unit 503, which may, e.g., correspond to a time delay of between about 5 and 500 nanoseconds) so as to slightly misalign the PWM carriers such that switching events for the PWM for the different motor controllers do not occur at the same time, which can again help reduce common mode emissions.

Thus, the present disclosure has recognised that when the switching matrix is configured such that several motor controllers are operating independently, to drive individual loads, there is in that case no need to align the PWM carriers for the different motor controllers, and there is flexibility to tune the phase and/or frequency of the PWM carrier signals to further reduce circulating currents, e.g. to reduce EMI emissions.

The present embodiment thus provides the ability to configure the PWM carriers to offer the best operation based on the aircraft demand for the system. In particular:

For parallel connected outputs, it can align the carriers to reduce circulating currents that can cause additional power losses and waveform distortions.

For independent motor loads, it can help to reduce EMI emissions which has the follow on benefits of reduced EMI filter size and weight. The CM current will be reduced resulting in smaller CM inductors and capacitor sizes and subsequently reduced power losses within the CM filter.

For a combination of parallel and independent loads, the scheme can both reduce circulating currents and limit EMI emissions.

Although much of the detailed description has been in the context of an aircraft system, the multiplexed system of this disclosure may find application in, and provide advantages in many fields where multiple loads are to be operated. Variations on the examples described fall within the scope of the claims.

The invention claimed is:

1. A system for providing electric motor control to a plurality of motor loads, the system comprising:
a plurality of motor controllers that are configurable into different arrangements of motor controllers, with each respective arrangement of motor controllers arranged to drive one or more of the motor loads, wherein a motor controller may be configured within a respective arrangement of motor controllers either to drive a respective motor load by itself or as part of a group of motor controllers that drive a respective motor load in combination,
wherein at least some of the motor controllers in the plurality of motor controllers comprise a respective pulse width modulation (PWM) circuit for controlling an output of the motor controller, the PWM circuit being controlled based on a respective PWM carrier signal; and a central controller that is operable to individually set a phase and/or frequency of the respective PWM carrier signals for the motor controllers, wherein the central controller is configured to set the phase or frequency of the PWM carrier signals for the motor controllers within a respective arrangement of motor controllers differently depending on the configuration of the motor controllers within the arrangement.

2. The system of claim 1, wherein when two or more motor controllers within a respective arrangement of motor controllers are operating independently to each drive a respective motor load, the central controller is configured to set the PWM carrier signals for the two or more independent motor controllers such that the PWM carrier signals are out of phase.

3. The system of claim 2, wherein the PWM carrier signals for at least two of the two or more independent motor controllers are 180 degrees out of phase.

4. The system of claim 2, the PWM carrier signals for two or more independent motor controllers are phase shifted such that switching events for the PWM within the motor controllers are misaligned.

5. The system of claim 1, wherein when two or more motor controllers within a respective arrangement of motor controllers are operating independently to each drive a respective motor load, the central controller is configured to set the PWM carrier signals for the two or more independent motor controllers such that the PWM carrier signals have different frequencies.

6. The system of claim 1, wherein when two or more motor controllers within a respective arrangement of motor controllers are operating in combination as part of a group of motor controllers arranged to drive a single respective motor load, the central controller is configured to synchronise the PWM carrier signals for the two or more motor controllers within the group such that the PWM carrier signals have substantially the same frequency and are substantially in phase with each other.

7. The system of claim 1, wherein central controller is operable to transmit a synchronisation pulse to a motor controller to trigger generation of a PWM carrier signal, and wherein when the central controller transmits a synchronisation pulse to trigger generation of the PWM carrier signal, the central controller also transmits instructions to set the phase and/or frequency of the PWM carrier signal.

8. The system of claim 1, further comprising switching means configured to selectively provide electrical connections between the one or more motor controllers and the loads; and a controller arranged to configure the switching means to connect one or more of the motor controllers to one or more of the loads in response to a control signal.

9. The system of claim 1, wherein the number of motor controllers is less than the number of motor loads to be controlled.

10. The system of claim 1, further including a common high voltage power supply for the plurality of motor controllers.

11. The system of claim 1, wherein the one or more motor loads correspond to one or more aircraft actuation systems, fans, pumps or compressors.

12. An aircraft including a plurality of motor loads and a system for providing electric motor control to the plurality of motor loads, the system comprising:
a plurality of motor controllers that are configurable into different arrangements of motor controllers, with each respective arrangement of motor controllers arranged to drive one or more of the motor loads, wherein a motor controller may be configured within a respective arrangement of motor controllers either to drive a respective motor load by itself or as part of a group of motor controllers that drive a respective motor load in combination,
wherein at least some of the motor controllers in the plurality of motor controllers comprise a respective pulse width modulation (PWM) circuit for controlling an output of the motor controller, the PWM circuit being controlled based on a respective PWM carrier signal; and
a central controller that is operable to individually set a phase and/or frequency of the respective PWM carrier signals for the motor controllers, wherein the central controller is configured to set the phase or frequency of the PWM carrier signals for the motor controllers within a respective arrangement of motor controllers differently depending on the configuration of the motor controllers within the arrangement.

13. A method of driving a plurality of electric motor loads using a system that comprises:
a plurality of motor controllers that are configurable into different arrangements of motor controllers, with each respective arrangement of motor controllers arranged to drive one or more of the motor loads, wherein a motor controller may be configured within a respective arrangement of motor controllers either to drive a respective motor load by itself or as part of a group of motor controllers that drive a respective motor load in combination,
wherein at least some of the motor controllers in the plurality of motor controllers comprise a respective pulse width modulation (PWM) circuit for controlling an output of the motor controller, the PWM circuit being controlled based on a respective PWM carrier signal;
the system further comprising a central controller that is operable to individually set a phase and/or frequency of the respective PWM carrier signals for the motor controllers, wherein the central controller is configured to set the phase and/or frequency of the PWM carrier signals for the motor controllers within a respective arrangement of motor controllers differently depending on the configuration of the motor controllers within the arrangement;
the method comprising:
configuring an arrangement of motor controllers to drive one or more of the motor loads, and setting the PWM carrier signals for the motor controllers based on the configuration of the motor controllers within the arrangement of motor controllers.

14. The method of claim 13, comprising re-configuring the system into a different arrangement of motor controllers to drive one or more of the loads, and then setting the PWM carrier signals for the motor controllers for the new arrangement of motor controllers.

* * * * *